US010623832B2

(12) United States Patent
Weatherhead et al.

(10) Patent No.: US 10,623,832 B2
(45) Date of Patent: Apr. 14, 2020

(54) SYSTEMS AND METHODS FOR TRANSFERRING DATA FROM REMOTE SITES

(71) Applicant: Sensia LLC, Houston, TX (US)

(72) Inventors: Norman Andrew Weatherhead, Kitchener (CA); Edward Anthony Gray, Olmsted Township, OH (US); Brian Allen Rex, Northfield, OH (US)

(73) Assignee: Sensia LLC, Houston, TX (US)

( * ) Notice: Subject to any disclaimer, the term of this patent is extended or adjusted under 35 U.S.C. 154(b) by 0 days.

(21) Appl. No.: 15/809,742

(22) Filed: Nov. 10, 2017

(65) Prior Publication Data
US 2019/0149894 A1 May 16, 2019

(51) Int. Cl.
| H04Q 9/00 | (2006.01) |
| G08B 21/18 | (2006.01) |
| G08B 7/06 | (2006.01) |
| E21B 41/00 | (2006.01) |
| H04B 7/185 | (2006.01) |
| E21B 47/00 | (2012.01) |
| E21B 47/12 | (2012.01) |
| H04L 29/08 | (2006.01) |
| B64C 39/02 | (2006.01) |

(52) U.S. Cl.
CPC ............. *H04Q 9/00* (2013.01); *E21B 41/00* (2013.01); *E21B 47/00* (2013.01); *G08B 7/06* (2013.01); *G08B 21/182* (2013.01); *H04B 7/18504* (2013.01); *B64C 39/024* (2013.01); *B64C 2201/122* (2013.01); *E21B 47/12* (2013.01); *H04L 67/10* (2013.01); *H04Q 2209/40* (2013.01); *H04Q 2209/50* (2013.01)

(58) Field of Classification Search
None
See application file for complete search history.

(56) References Cited

U.S. PATENT DOCUMENTS

2015/0369013 A1* 12/2015 Weatherhead .......... E21B 41/00 700/275
2016/0214715 A1* 7/2016 Meffert ................ B64C 39/024
(Continued)

FOREIGN PATENT DOCUMENTS

WO 2015191444 A2 12/2015

*Primary Examiner* — Leon Viet Q Nguyen
(74) *Attorney, Agent, or Firm* — Foley & Lardner LLP

(57) ABSTRACT

A system includes a cloud-based computing system communicatively coupled to a first communication network. The system includes one or more remote terminal units (RTUs) configured to control operations of one or more well devices associated with a hydrocarbon well, wherein the one or more RTUs are inaccessible to the first communication network. The system also includes a mobile computing device configured to communicatively couple to the one or more RTUs via a second communication network in response to the mobile computing device being within a coverage range of the second communication network. The mobile computing device is also configured to download data from the one or more RTUs via the second communication network, communicatively couple to the cloud-based computing system in response to detecting access to the first communication network, and transmit the data to the cloud-based computing system via the first communication network.

12 Claims, 6 Drawing Sheets

(56) References Cited

U.S. PATENT DOCUMENTS

2016/0334276 A1* 11/2016 Pluvinage ............. G01J 3/2823
2017/0064755 A1*  3/2017 Ha ..................... H04W 4/06
2018/0069933 A1*  3/2018 Chandra ............... H04L 12/66

* cited by examiner

SYSTEMS AND METHODS FOR TRANSFERRING DATA FROM REMOTE SITES

BACKGROUND

The present disclosure relates generally to improved monitoring of operations at a hydrocarbon well site. More specifically, the present disclosure relates to acquiring data from a remote hydrocarbon well site.

As hydrocarbons are extracted from hydrocarbon reservoirs via hydrocarbon wells in oil and/or gas fields, the extracted hydrocarbons may be transported to various types of equipment, tanks, and the like via a network of pipelines. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Information related to the extracted hydrocarbons or related to the equipment extracting, transporting, storing, or processing the extracted hydrocarbons may be gathered at the well site or at various locations along the network of pipelines. This information or data may be used to ensure that the well site or pipelines are operating safely and that the extracted hydrocarbons have certain desired qualities (e.g., flow rate, temperature). However, given the remote locations in which hydrocarbon well sites are located, it may be challenging to access or communicate these information or data to a centralized system or location to be processed and/or analyzed. Accordingly, it is now recognized that improved systems and methods for accessing data from remote sites, such as a hydrocarbon well site, are desirable.

BRIEF DESCRIPTION

In one embodiment, a system includes a cloud-based computing system communicatively coupled to a first communication network. The system includes one or more remote terminal units (RTUs) configured to control operations of one or more well devices associated with a hydrocarbon well, wherein the one or more RTUs are inaccessible to the first communication network. The system also includes a mobile computing device configured to communicatively couple to the one or more RTUs via a second communication network in response to the mobile computing device being within a coverage range of the second communication network. The mobile computing device is also configured to download data from the one or more RTUs via the second communication network, communicatively couple to the cloud-based computing system in response to detecting access to the first communication network, and transmit the data to the cloud-based computing system via the first communication network.

In another embodiment, a method includes communicatively coupling, via a processor, to one or more remote terminal units (RTUs) in response to the processor being within a distance to the one or more RTUs, wherein the one or more RTUs are configured to control operations of one or more well devices associated with a hydrocarbon well. The method includes downloading, via the processor, data from the one or more RTUs via a first communication network. The method includes communicatively coupling, via the processor, to a cloud-based computing system in response to detecting access to a second communication network, wherein the one or more RTUs are inaccessible to the second communication network. The method also includes transmitting, via the processor, the data to the cloud-based computing system via the second communication network.

In yet another embodiment, a drone device includes a motor and a processor. The processor is configured to receive mapping information comprising one or more locations of one or more remote terminal units (RTUs), wherein the one or more RTUs are configured to control operations of one or more well devices associated with a hydrocarbon well. The processor is configured to cause the motor to operate such that the drone device flies to the one or more locations of the one or more RTUs. The processor is configured to communicatively couple to the one or more RTUs in response to the drone device being within a coverage range of a first communication network. The processor is configured to download data from the one or more RTUs via the first communication network. The processor is configured to communicatively couple to a cloud-based computing system in response to detecting access to a second communication network, wherein the one or more RTUs are inaccessible to the second communication network. The processor is also configured to transmit the data to the cloud-based computing system via the second communication network.

DRAWINGS

These and other features, aspects, and advantages of the present embodiment disclosed herein will become better understood when the following detailed description is read with reference to the accompanying drawings in which like characters represent like parts throughout the drawings, wherein.

Figure 1:
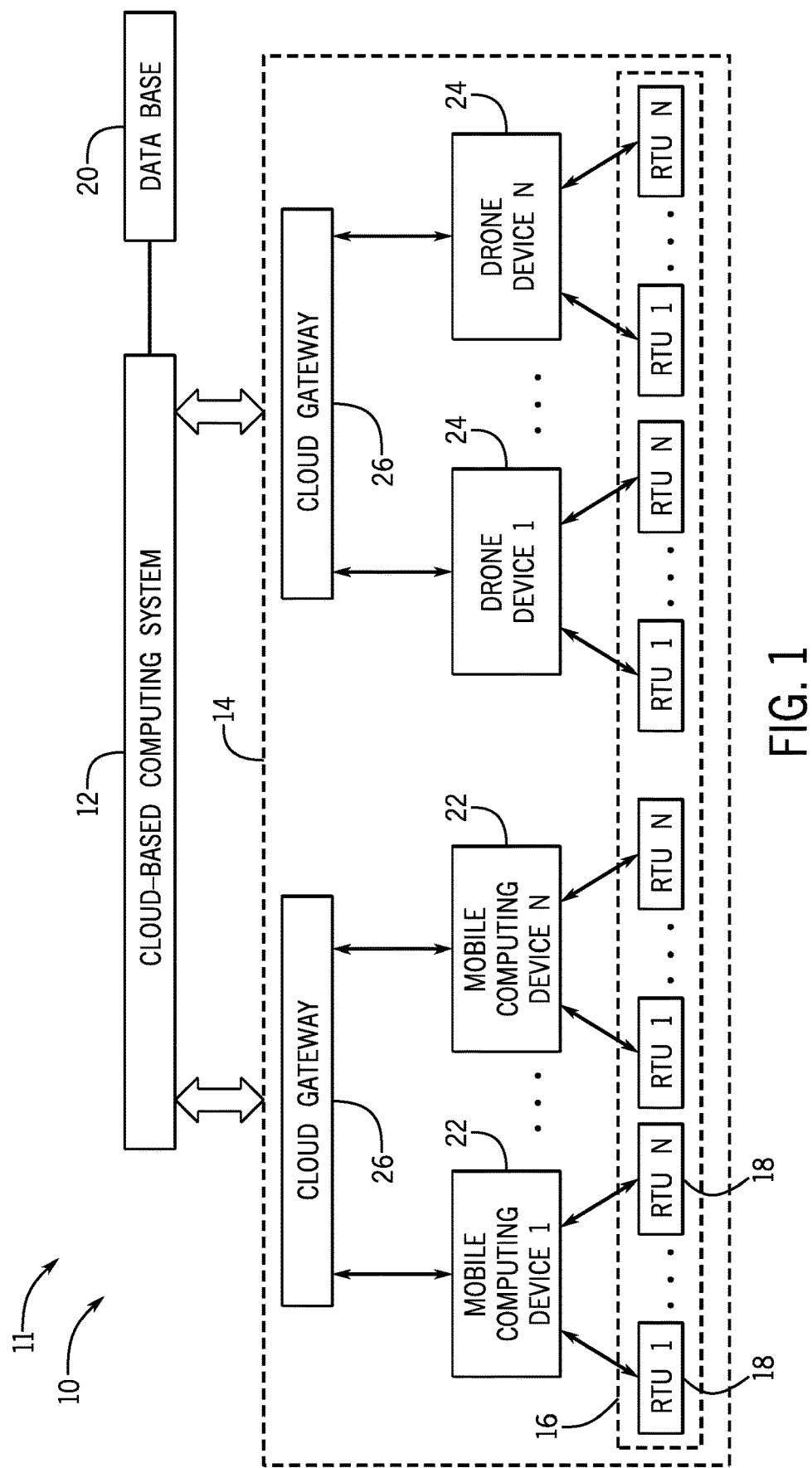
FIG. 1 illustrates an overview of a communication architecture of an industrial enterprise that leverages a cloud-based computing system, in accordance with embodiments presented herein.
Figure 5:
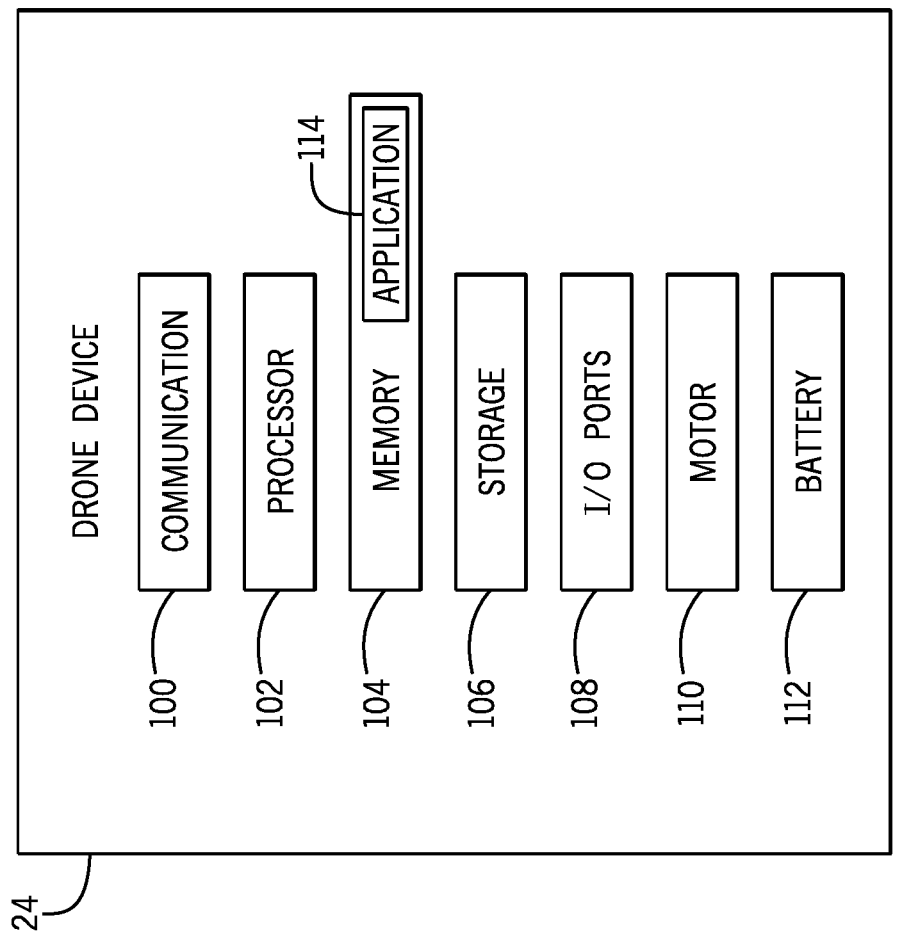
Figure 6:
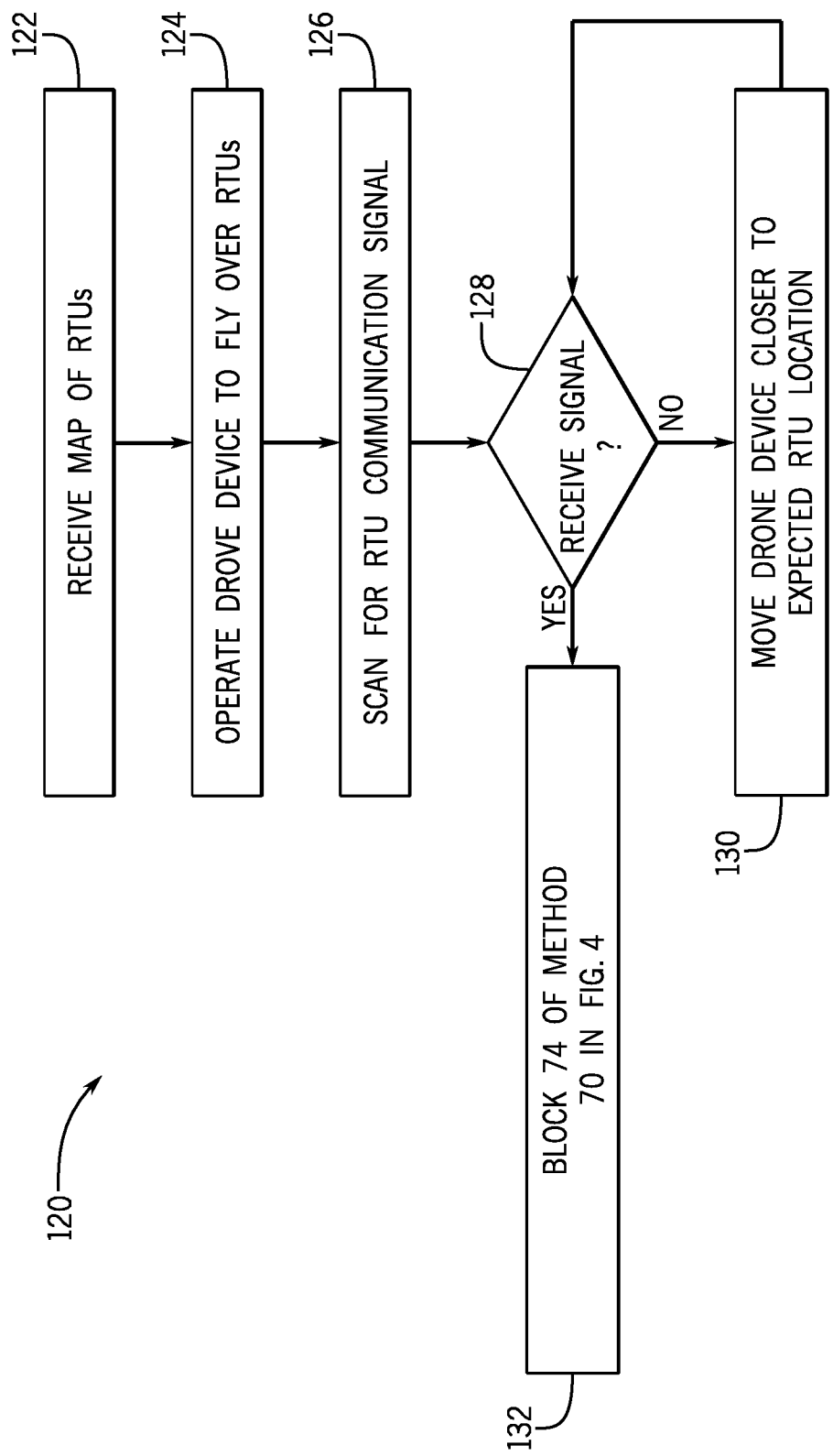

FIG. 5 illustrates a block diagram of a drone device that may be employed in the communication architecture of FIG. 1, in accordance with embodiments presented herein; and FIG. 6 illustrates a flow chart of a method of using the drone device of FIG. 5 for automatically accessing and communicating data from a remote terminal unit (RTU) to the cloud-based computing system of FIG. 1, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for accessing data collected at a remote site, such as a hydrocarbon well site. Moreover, embodiments of the present disclosure are related to improving communication architecture to communicate data from a remote site to a cloud-based computing system.

Generally, a hydrocarbon well site may include a monitoring system that may be placed at various locations at the hydrocarbon site to monitor information or data related to certain aspects of the hydrocarbon well site. For example, the hydrocarbon well site may include one or more remote terminal units (RTUs) that may monitor and store information or data related to operation of the hydrocarbon well site. The monitored information or data may be processed and/or analyzed to provide valuable insights with respect to various aspects of the hydrocarbon well site. If the hydrocarbon well site is located where suitable communication network (e.g., Internet) is available, the monitored information or data may be transmitted to a cloud-based computing system having relatively higher computation power as compared to the RTUs to process and/or analyze the information or data. However, given a hydrocarbon well site is often at a remote location, where a suitable communication network is not available, accessing to the monitored information or data may be difficult or costly (e.g., unrealistic or economically not viable to establish a suitable communication network for a remote location). Nonetheless, the monitored information or data may be of value to the enterprise operating the hydrocarbon well site. Accordingly, it is now recognized that improved systems and methods for accessing data from a remote site, such as a hydrocarbon well site, are desirable.

In particular, in the absence of a long-range wireless communication network connected to a cloud-based computing system, mobile computing devices (e.g., mobile phones, smartphones, tablets, laptop computers) may be utilized to download data from RTUs via short-range wireless communication techniques and perform preliminary analyses based on the downloaded data. Subsequently, when the mobile computing devices are brought back to locations where suitable communication to the cloud-based computing system is available, the mobile computing devices may transmit the downloaded data and/or results of the preliminary analyses to the cloud-based computing system. In some embodiments, the mobile computing devices may generate an alert or send instructions for assets at the hydrocarbon site to implement based on the preliminary analyses performed by the mobile computing devices.

Alternatively or additionally, drone devices or the like may be utilized to perform similar functions as the mobile computing devices set forth above. In particular, the drone devices may be automated to fly to various RTUs to download data and/or perform preliminary analyses. As such, in the absence of a long-range wireless communication network (e.g., Internet), the mobile computing devices and/or drone devices capable of downloading data via short-range wireless communication techniques (e.g., Bluetooth®, infrared (IR) communication, radio frequency (RF) communication, and the like) may bridge the connection between the RTUs and the cloud-based computing system. It should be noted that while an RTU is used as an example, the systems and methods discussed herein may be used to download data from any suitable appliances (e.g., devices having controllers) capable of storing data and communicating data via short-range wireless communication techniques.

By way of introduction, FIG. 1 illustrates a high-level overview of communication architecture 10 of an industrial enterprise 11 that leverages a cloud-based computing system 12 to improve operations of various industrial devices. The enterprise 11 may include one or more industrial facilities 14, each having a number of industrial devices 16 in use. The industrial devices 16 may make up one or more automation systems operating within the respective facilities 14. Exemplary automation systems may include, but are not limited to, batch control systems (e.g., mixing systems), continuous control systems (e.g., proportional-integral-derivative (PID) control systems), or discrete control systems. Although the industrial enterprise 11 of FIG. 1 is described with respect to automation systems, it should be noted that the industrial enterprise 11 described herein may be applied to other industrial environments, such as hydrocarbon production well sites, as will be detailed below.

Industrial devices 16 may include devices, such as industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers and readers, vision system devices (e.g., vision cameras), smart welders, or other such industrial devices. The industrial devices 16 may also be part of a mobile control application, such as a system contained in a skid, a truck, or other service vehicle. Information or data related to various aspects of the industrial devices 16 may be monitored via a monitoring system. The monitoring system may be a controller, a remote terminal unit (RTU), or any computing device that may include communication abilities, processing abilities, and the like. For discussion purposes, the monitoring system will be embodied as RTUs 18 throughout the present disclosure. However, it should be understood that the RTU 18 may be any suitable component capable of monitoring and/or controlling various components of the industrial devices 16. There may be wired communication or wireless short-range communication (e.g., Bluetooth®, infrared (IR) communication, radio frequency (RF) communication, and the like) to enable communication (e.g., data transmission) of the industrial devices 16 and the RTUs 18.

In certain embodiments, the cloud-based computing system 12 may be a public cloud accessible via the Internet by devices having Internet connectivity and appropriate authorizations to utilize cloud-based services. In some scenarios, the cloud-based computing system 12 may be a platform-as-a-service (PaaS), and the cloud-based services may reside and execute on the cloud-based computing system 12. In certain instances, access to cloud-based computing system 12 may be provided to users as a subscription service by an owner of the respective cloud-based services. Alternatively, the cloud-based computing system 12 may be a private network of computers operated internally by the industrial enterprise 11. For example, the cloud-based computing system 12 may involve a set of servers hosting the cloud-based services and residing on an internal network protected by a firewall. The cloud-based services may include, but are not limited to, data storage, data analysis, control applications, visualization applications such as the cloud-based operator interface system, reporting applications, Enterprise Resource Planning (ERP) applications, notification services, or other such applications. In certain embodiments, the cloud-based computing system 12 may also be communicatively coupled to a database 20 that may store data. The cloud-based computing system 12 may use the data stored within the database 20 to perform various types of data analyses.

Generally, the cloud-based computing system 12 may be dedicated to performing various types of complex and time-consuming analysis that may include analyzing a large amount of data. As such, in some embodiments, the industrial enterprise 11 may leverage the computing power of the cloud-based computing system 12 to analyze data acquired from a number of RTUs 18, perform more comprehensive data analyses more efficiently, and/or provide users or personnel with accesses to additional information and operational support to more efficiently manage the operations of the industrial enterprise 11. As set forth above, the industrial enterprise 11, such as a hydrocarbon production well site, may be at a remote location where no suitable communication network is available for transmitting data from the industrial enterprise 11 to the cloud-based computing system 12. In the absence of a suitable communication network (e.g., Internet), the communication architecture 10 may use one or more mobile computing devices 22 (e.g., mobile phones, smartphones, tablets, laptop computers) and/or one or more drone devices 24 or the like to download data from the RTUs 18, and subsequently transmit the downloaded data to the cloud-based computing system 12 when suitable communication network (e.g., Internet) becomes available.

As an example, in the absence of a network connection, data collected by the RTU 18 may be stored in the RTU 18 until a user carrying the mobile computing device 22 travels near the RTU 18. After the mobile computing device 22 is within an effective distance where short-range wireless communication is available (e.g., Bluetooth®, IR communication, radio frequency (RF) communication, local wireless network, or the like), the mobile computing device 22 may download the data stored on the RTU 18 and store the downloaded data in the mobile computing device 22. Subsequently, the mobile computing device 22 may transmit the downloaded data to the cloud-based computing system 12 after the mobile computing device 22 is brought to a location where a network connection (e.g., accessible to cloud-based computing system 12) is available. In certain embodiments, the mobile computing device 22 can download and store data from multiple RTUs 18 and transmit the downloaded data to the cloud-based computing system 12 when a communication link to the cloud-based computing system 12 is established. As another example, in the absence of a network connected RTU 18, the drone device 24 may fly to one or more RTUs 18 to download data and subsequently fly to a location where network connection is available and transmit the downloaded data to the cloud-based computing system 12. In this manner, by utilizing the one or more mobile computing devices 22 and/or the one or more drone devices 24 as part of the communication architecture 10, even in the absence of network connection, the communication architecture 10 may transfer data stored on the RTUs 18 to the cloud-based computing system 12.

In certain embodiments, the communication architecture 10 may include separate cloud gateways 26 at the respective industrial facilities 14 to provide communication to the cloud-based computing system 12. For example, the cloud gateways 26 may serve as intermediaries in a communication link between the mobile computing devices 22 or the one or more drone devices 24 and the cloud-based computing system 12. In this case, the one or more mobile computing devices 22 and/or the one or more drone devices 24 may upload the downloaded data to the cloud-based computing system 12 via the cloud gateways 26.

Figure 2:
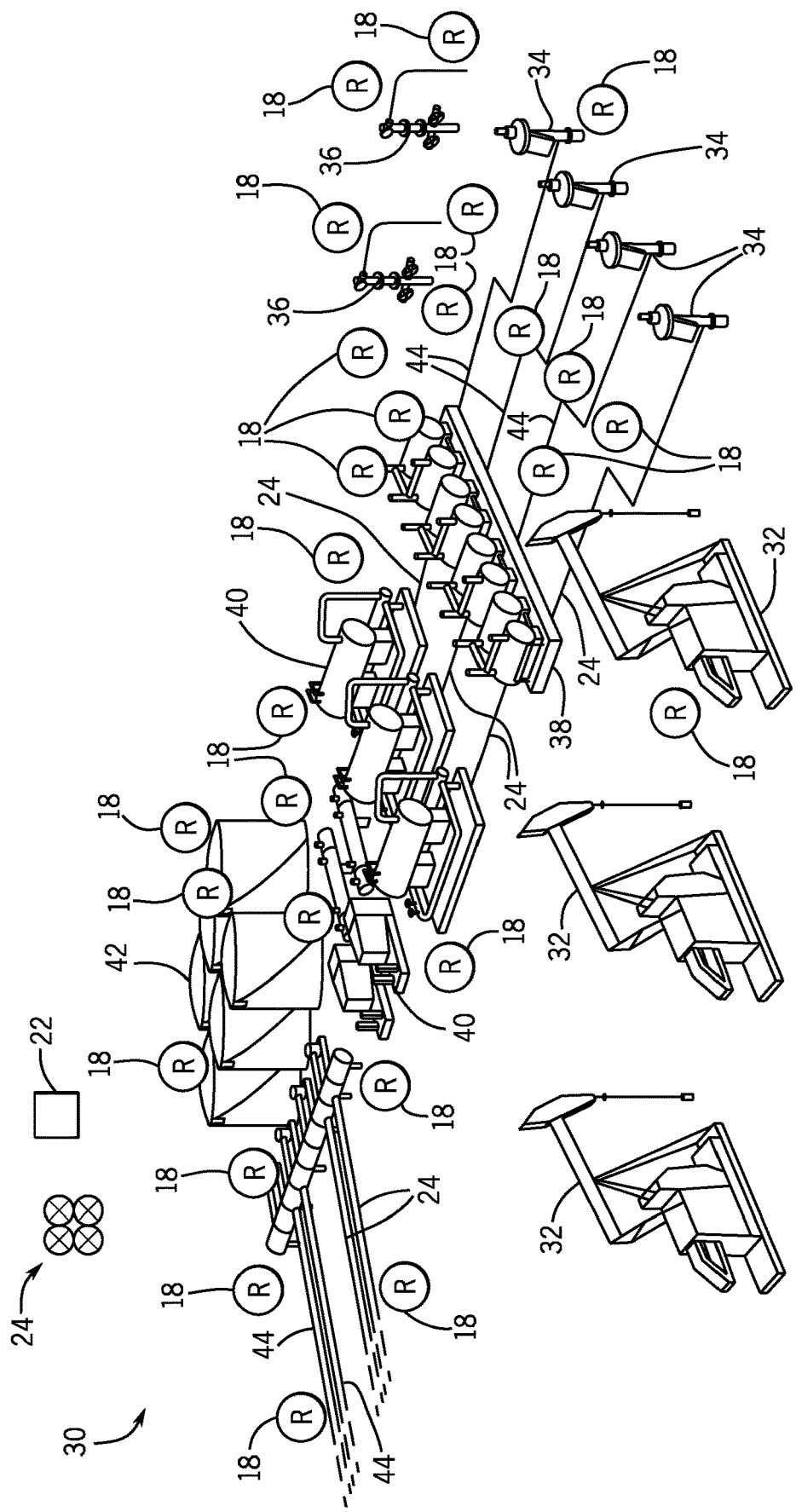
FIG. 2 illustrates a schematic diagram of an example hydrocarbon site that may produce and process hydrocarbons, in accordance with embodiments presented herein.

As mentioned above, the cloud-based computing system 12 may also be implemented in other industrial environments such as a hydrocarbon well site, and the like. Keeping this in mind, FIG. 2 illustrates a schematic diagram of an example hydrocarbon site 30 that may employ the cloud-based computing system 12 to assist in the operation and maintenance of various well devices at the hydrocarbon site 30. In the illustrated embodiment, the hydrocarbon site 30 may be an area in which hydrocarbons, such as crude oil and natural gas, may be extracted from the ground, processed, and stored. As such, the hydrocarbon site 30 may include a number of wells and a number of well devices that may control the flow of hydrocarbons being extracted from the wells. In one embodiment, the well devices at the hydrocarbon site 30 may include any device equipped to monitor and/or control production of hydrocarbons at a well site. As such, the well devices may include pumpjacks 32, submersible pumps 34, well trees 36, and the like. After the hydrocarbons are extracted from the surface via the well devices, the extracted hydrocarbons may be distributed to other devices such as wellhead distribution manifolds 38, separators 40, storage tanks 42, and the like. At the hydrocarbon site 30, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 30 via the network of pipelines 44.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 30.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 30 to monitor or provide information related to certain aspects of the hydrocarbon site 30. The monitoring system may be a controller, a remote terminal unit (RTU), or any computing device that may include communication abilities, processing abilities, and the like. As set forth above, for discussion purposes, the monitoring system is embodied as the RTU 18 throughout the present disclosure. However, it should be understood that the RTU 18 may be any component capable of monitoring and/or controlling various components at the hydrocarbon site 30.

The RTU 18 may include sensors or may be coupled to various sensors that may monitor various properties associated with a component at the hydrocarbon site. The RTU 18 may then analyze the various properties associated with the component and may control various operational parameters of the component. For example, the RTU 18 may measure a pressure or a differential pressure of a well or a component (e.g., storage tank 42) in the hydrocarbon site 30. The RTU 18 may also measure a temperature of contents stored inside a component in the hydrocarbon site 30, an amount of hydrocarbons being processed or extracted by components in the hydrocarbon site 30, and the like. The RTU 18 may also measure a level or amount of hydrocarbons stored in a component, such as the storage tank 42. In certain embodiments, the RTU 18 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by Rockwell Automation®.

In one embodiment, the RTU 18 may include a sensor that may measure pressure, temperature, fill level, flow rates, and the like. The RTU 18 may also include a transmitter, such as a radio wave transmitter, that may transmit data acquired by the sensor via an antenna or the like. The sensor in the RTU 18 may be wireless sensors that may be capable of receive and sending data signals between RTUs 18. To power the sensors and the transmitters, the RTU 18 may include a battery or may be coupled to a continuous power supply. Since the RTU 18 may be installed in harsh outdoor and/or explosion-hazardous environments, the RTU 18 may be enclosed in an explosion-proof container that may meet certain standards established by the National Electrical Manufacturer Association (NEMA) and the like, such as a NEMA 4X container, a NEMA 7X container, and the like.

The RTU 18 may transmit data acquired by the sensor or data processed by a processor to other monitoring systems, a router device, a supervisory control and data acquisition (SCADA) device, or the like. As such, the RTU 18 may enable users to monitor various properties of various components in the hydrocarbon site 30 without being physically located near the corresponding components.

In operation, the RTU 18 may receive real-time or near real-time data associated with a well device. The data may include, for example, tubing head pressure, tubing head temperature, case head pressure, flowline pressure, wellhead pressure, wellhead temperature, and the like. In any case, the RTU 18 may analyze the real-time data with respect to static data that may be stored in a memory of the RTU 18. The static data may include a well depth, a tubing length, a tubing size, a choke size, a reservoir pressure, a bottom hole temperature, well test data, fluid properties of the hydrocarbons being extracted, and the like. The RTU 18 may also analyze the real-time data with respect to other data acquired by various types of instruments (e.g., water cut meter, multiphase meter) to determine an inflow performance relationship (IPR) curve, a desired operating point for the wellhead, key performance indicators (KPIs) associated with the wellhead, wellhead performance summary reports, and the like.

Although the RTU 18 may be capable of performing the above-referenced analyses, the RTU 18 may not be capable of performing the analyses in a timely manner. Moreover, by just relying on the processor capabilities of the RTU 18, the RTU 18 is limited in the amount and types of analyses that it may perform. Moreover, since the RTU 18 may be limited in size, the data storage abilities may also be limited. Keeping the foregoing in mind, in certain embodiments, the information or data stored in the RTU 18 may be transmitted (e.g., via the mobile computing device 22 and/or the drone device 24) to the cloud-based computing system 12. That is in cases that connection to a suitable communication (e.g., Internet) is not available, the information or data stored in the RTU 18 may be transmitted to the cloud-based computing system 12 using the mobile computing device 22 and/or the drone device 24 as intermediary data carrier. The cloud-based computing system 12 may use its larger processing capabilities to analyze data acquired by multiple RTUs 18. In certain embodiments, the mobile computing device 22 and/or the drone device 24 may also perform preliminary analyses based on the data collected by the RTU 18. The results of the preliminary analyses may also be transmitted to the cloud-based computing system 12.

Figure 3:
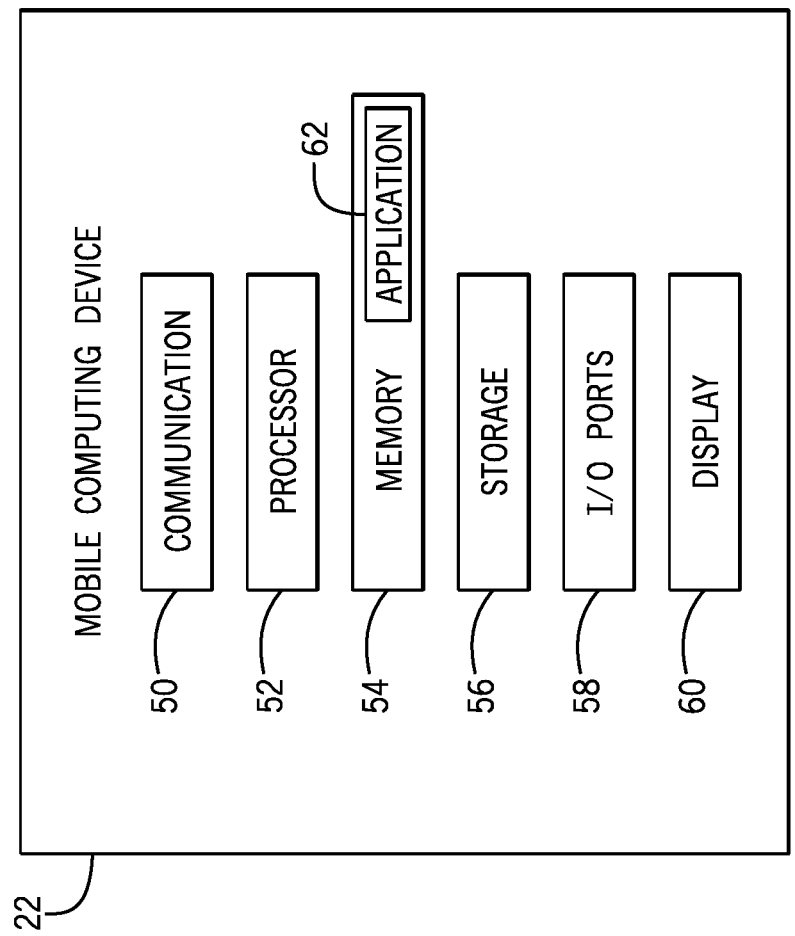
FIG. 3 illustrates a block diagram of a mobile computing device that may be employed in the communication architecture of FIG. 1, in accordance with embodiments presented herein.

FIG. 3 illustrates a block diagram of the mobile computing device 22 that may be employed in the communication architecture 10 of FIG. 1. In the illustrated embodiment, the mobile computing device 22 may include a communication component 50, a processor 52, a memory 54, a storage 56, input/output (I/O) ports 58, a display 60, and the like. The communication component 50 may be a wireless or wired communication component that may facilitate communication with different RTUs 18, gateway communication devices of the cloud gateways 26, the cloud-based computing system 12, the various control systems, and the like. The processor 52 may be any type of computer processor or microprocessor capable of executing computer-executable code. The memory 54 and the storage 56 may be any suitable articles of manufacture that can serve as media to store processor-executable code, data, or the like. These articles of manufacture may represent computer-readable media (i.e., any suitable form of memory or storage) that may store the processor-executable code used by the processor 52 to perform the presently disclosed techniques.

The memory 54 or the storage 56 may be used to store data downloaded from the one or more RTUs 18. The memory 54 and the storage 56 may be used to store data received via the I/O ports 58, data analyzed by the processor 52, or the like. The memory 54 and the storage 56 may be used to store data related to the RTU 18. Examples of the data related to the RTU 18 may include an indication of an identity of the RTU 18, a location (e.g., global positioning system (GPS) coordinate) of the RTU 18, a context or relationship of the RTU 18 within the communication architecture 10, a vendor associated with the RTU 18, a model number associated with the RTU 18, a serial number associated with the RTU 18, a firmware version associated with the RTU 18, a well device software application associated with the RTU 18, and the like. The memory 54 and the storage 56 may be used to store data providing details regarding the well site associated with the RTU 18. That is, the data may indicate a location (e.g., GPS coordinates) associated with the well site, a type of well site that is being monitored and/or controlled. For instance, the well site may be a land oil site, a subsea oil site, a gas site, a shale gas site, or the like.

The memory 54 or the storage 56 may also be used to store an application 62, a firmware, an application portability profile (APP), or the like. The application 62 may run in the background or upon execution by a user. The application 62 when executed by the processor 52 may enable the mobile computing device 22 to function as intermediary data carrier in the communication architecture 10. That is, the application 62 may enable the mobile computing device 22 to connect to and download data from the RTU 18 when the mobile computing device 22 is within an effective distance of wireless short-range communication (e.g., Bluetooth®, infrared (IR) communication, radio frequency (RF) communication, and the like) with the respective RTU 18. Subsequently, the application 62 may enable the mobile computing device 22 to connect to and upload data to the cloud gateways 26 or the cloud-based computing system 12 when suitable communication (e.g., Internet) is available. The application 62, when executed by the processor 52, may also enable the mobile computing device 22 to perform preliminary analyses based on the data downloaded from the RTU 18. The preliminary analyses may include determining whether the data downloaded from the RTU 18 are within an expected range of values. Examples of data may include extracted hydrocarbon flow rates, temperatures and amounts of hydrocarbons being processed or extracted by components in the hydrocarbon site 30, tubing head pressure, tubing head temperature, case head pressure, flowline pressure, wellhead pressure, wellhead temperature, well depth, tubing length, tubing size, choke size, reservoir pressure, bottom hole temperature, well test data, fluid properties of the hydrocarbons being extracted, and the like. The application 62, when executed by the processor 52, may also enable the mobile computing device 22 to provide an alert or indication when the downloaded data are outside an expected range of values. It should be noted that the alert or indication may be provided in any suitable manner (e.g., visual or audio alerts). In some embodiments, the alert may cause the application 62 to alter the appearance of the display 60, the operation of the mobile computing device 22, or the like, such that the user of the mobile computing device 22 is aware of the alert even when the mobile computing device 22 is in a sleep or power-savings mode. That is, the mobile computing device 22 may receive the alert, which may cause the mobile computing device 22 to exit a current mode of operation (e.g., sleep) to provide an indication to the user of the alert.

The I/O ports 58 may be interfaces between the mobile computing device 22 and other types of equipment, computing computing devices, or peripheral devices. The display 60 may include any type of electronic display such as a liquid crystal display, a light-emitting-diode display, and any type of audio transducer such as a speaker. In certain embodiments, the display 60 may be a touch screen display or any other type of display capable of receiving inputs from the user of the mobile computing device 22. In certain embodiments, results of the preliminary analyses and/or the alert or indication (e.g., provided when the downloaded data are outside an expected range of values) may be presented using the display 60.

Figure 4:
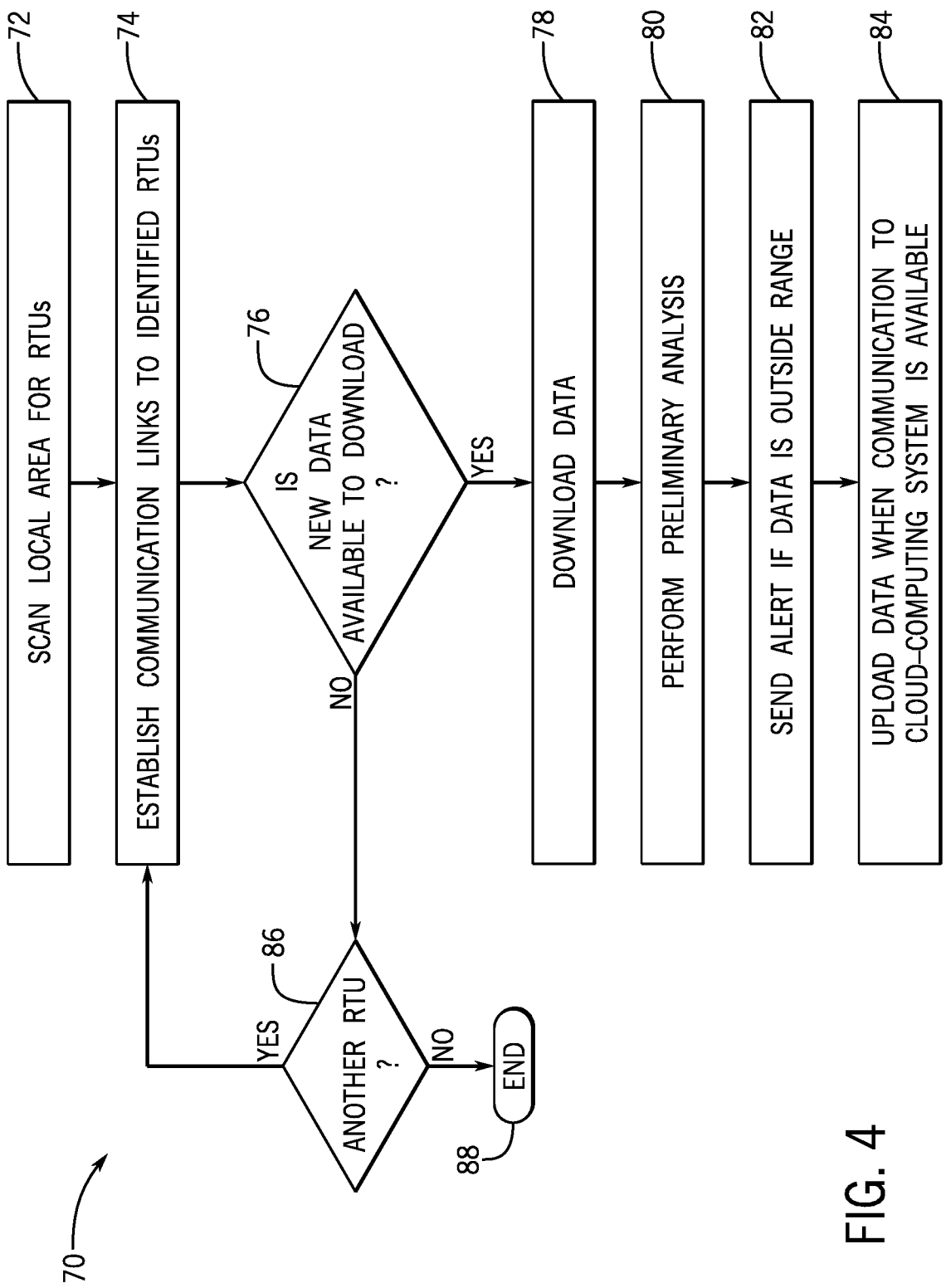
FIG. 4 illustrates a flow chart of a method of using the mobile computing device of FIG. 3 for automatically accessing and communicating data from a remote terminal unit (RTU) to the cloud-based computing system of FIG. 1, in accordance with embodiments presented herein.

FIG. 4 illustrates a flow chart of a method 70 of using the mobile computing device 22 of FIG. 3 for automatically accessing and communicating data collected by the RTU 18 to the cloud-based computing system 12 of FIG. 1. Although the following description of the method 70 is provided in a particular order, it should be noted that the method 70 may be performed in any suitable order. In addition, although the method 70 is described as being performed by the mobile computing device 22, it should be understood that the method 70 may be performed by any suitable computing device.

Referring now to FIG. 4, at block 72, the mobile computing device 22 may scan a local area for the RTUs 18. For example, the mobile computing device 22 may scan for Bluetooth, IR, or RF signals broadcasted by the RTUs 18. The signals broadcast by the RTUs 18 may include identification data regarding the RTUs 18 and/or indications of presence of the RTUs 18. In certain embodiments, the mobile computing device 22 may continuously scan the local area scan the local area at regular or irregular intervals, while the mobile computing device 22 is powered on, regardless of the application being executed on the mobile computing device 22.

At block 74, the mobile computing device 22 may establish communication to RTUs 18 detected during the scan. It should be noted that the communication to the identified RTUs 18 may be established automatically when the mobile computing device 22 is within an effective range of short-range wireless communication (e.g., Bluetooth®, IR communication, radio frequency (RF) communication, and the like). As such, the RTUs 18 may regularly send an identification message to be detected by the scanning mobile computing device 22. In certain embodiments, after identifying the RTUs 18, the mobile computing device 22 may send an acknowledge message to the RTUs 18 indicating that the mobile computing device 22 has recognized the presence of the RTUs 18. Alternatively, the mobile computing device 22 may send identification messages that may be detected by the RTUs 18, which may then send acknowledgement signals to the mobile computing device 22.

After the mobile computing device 22 establishes a communication link to the identified RTUs 18, at block 76, the mobile computing device 22 may receive a signal or an indication from each of the connected RTUs 18 indicating whether new data is available for download. For example, the signal or indication may indicate whether there is new data acquired by the RTUs 18 since the last data downloading to the respective mobile computing device 22. In some embodiments, after establishing the communication link, the mobile computing device 22 may provide an indication of the data previously acquired from the respective RTU 18 and uploaded to the cloud-based computing system 12. The RTU 18 may then remove a tag or alter the metadata of the previously transmitted data to indicate that the data was successfully uploaded.

Upon receiving the indication that there is new data available for download, at block 78, the mobile computing device 22 may download the new data. At block 80, the mobile computing device 22 may perform preliminary analyses based on the downloaded data. As set forth above, the mobile computing device 22 may determine whether the data downloaded from the RTU 18 are within an expected range of values. Examples of data may include any data acquired by the RTU 18, such as extracted hydrocarbon flow rates, temperatures and amounts of hydrocarbons being processed or extracted by components in the hydrocarbon site 30, tubing head pressure, tubing head temperature, case head pressure, flowline pressure, wellhead pressure, wellhead temperature, well depth, tubing length, tubing size, choke size, reservoir pressure, bottom hole temperature, well test data, fluid properties of the hydrocarbons being extracted, and the like. It should be noted that the preliminary analyses may not involve intensive computing power or significant computational time. In other words, the preliminary analyses may be performed on the limited computing power available via the mobile computing device 22, as compared to the computing power available via the cloud-based computing system 12. The results of the preliminary analyses may be saved in the memory 54 or the storage 56 of the mobile computing device 22.

At block 82, the mobile computing device 22 may send an alert or indication in response to determining that the downloaded data are outside the respective expected range of values. For example, an audio or visual alert may be presented via the display 60 of the mobile computing device 22. The audio or visual alert may include information showing a comparison between the downloaded values and the expected range of values. As such, the user of the mobile computing device 22 may have knowledge of preliminary assessment with respect to certain aspects relating to operation of the hydrocarbon site 30. In some embodiments, after the alert is generated, the mobile computing device 22 may send a command to the RTU 18 to adjust the operations of a respective machine based on the alert. By way of example, if the alert indicates that a detected temperature is above a threshold, the mobile computing device 22 may send a command to the respective RTU 18 to cease the operation of the respective machine.

At block 84, the mobile computing device 22 may upload the data to the cloud-based computing system 12 when suitable communication (e.g., Internet) is available. As such, the mobile computing device 22 may scan the area at regular or irregular intervals for a communication link to the cloud-based computing system 12. After the mobile computing device 22 detects the communication link to the cloud-based computing system 12, the mobile computing device 22 may send the downloaded data to the cloud-based computing system 12. The data may include the downloaded data from the RTU 18, as well as results of the preliminary analyses.

Referring back to block 76, if the signal or indication indicates that there is no new data available, the method 70 may proceed to block 86 where the mobile computing device 22 may determine whether there is another identified RTU 18 within the proximity. If so (e.g., another RTU 18 identified), the mobile computing device 22 may return to block 74 and proceed through block 84. If not (e.g., no other RTU 18 identified), the mobile computing device 22 may end the method 70 at block 88. As such, the communication architecture 10 may reduce the redundancy of downloading and/or analyzing data that has already been downloaded and/or analyzed.

FIG. 5 illustrates a block diagram of the drone device 24 that may be employed in the communication architecture 10 of FIG. 1. In the illustrated embodiment, the drone device 24 may include a communication component 100, a processor 102, a memory 104, a storage 106, input/output (I/O) ports 108, a motor 110, and a battery 112. The communication component 100, the processor 102, the memory 104, the storage 106, the I/O ports 108, and application 114 may correspond to the descriptions provided above with respect to similar components of the mobile computing device 22 of FIG. 3. The motor 110 may be any suitable drone motor or engine that enables aerial movements of the drone device 24. The battery 112 may be any suitable rechargeable and/or non-rechargeable battery or power storage device that is capable of powering operation of the drone device 24 (e.g., providing power for various components of the drone device 24).

With the foregoing in mind, the drone device 24 may be used in a similar manner as the mobile computing device 22 described above except for the additional ability to fly to various RTUs 18 disposed throughout the hydrocarbon site 30. For instance, FIG. 6 illustrates a flow chart of a method 120 of using the drone device 24 of FIG. 5 for automatically accessing and communicating data collected by the RTU 18 to the cloud-based computing system 12 of FIG. 1. Like the method 70, although the following description of the method 120 is provided in a particular order, it should be noted that the method 120 may be performed in any suitable order. In addition, although the method 120 is described as being performed by the drone device 24, it should be understood that the method 120 may be performed by any suitable computing device that is capable of adjusting its position.

Referring to FIG. 6, at block 122, the drone device 24 may receive a map or mapping information (e.g., global positioning system (GPS) coordinate) of the RTUs 18. The drone device 24 may receive the map via wired or wireless communication, and the map may be stored in in the memory 104 or the storage 106 of the drone device 24. The map may also include GPS coordinates of the cloud gateways 26 and/or other components of the hydrocarbon site 30. In certain embodiments, transmitting of the map to the drone device 24 may be controlled via a controller (including a processor and memory) at the hydrocarbon site 30.

At block 124, the drone device 24 may fly over the RTUs 18 identified in the map. For example, after receiving the map of RTUs 18, the drone device 24 fly to the locations associated with RTUs 18.

At block 126, after reaching a location that corresponds to a respective RTU 18, the drone device 24 may scan for communication signals from the respective RTU 18. For example, as the drone device 24 flies approaches the location of a respective RTU 18, the drone device 24 may scan a local area for Bluetooth, IR, RF, or near-field signals broadcast by the respective RTU 18.

At block 128, the drone device 24 may determine whether communication signals from the RTUs 18 were received. If the communication signals were received, the drone device 24 may proceed to block 132. At block 134, the drone device 24 may perform the operations of block 74 in the method 70 as discussed above in FIG. 4. However, if the drone device 24 does not receive any communication signal from the respective RTU 18 at block 128, the drone device 24 may move closer to an expected location of the respective RTU 18 as identified on the map (block 130). For example, the drone device 24 may not receive communication signals from the RTUs 18 because the drone device 24 is too high or too far away from the physical RTUs 18. Thus, the drone device 24 may change its route and/or position to get closer to or decrease the distance between itself and the respective RTU 18. After adjusting its position at block 130, the drone device 24 may return to block 128 and scan again for a communication signal from the respective RTU 18. As such, the drone device 24 may continue to adjust its position until a communication signal from the respective RTU 18 is received.

Referring back to block 128, after the communication signal is received, the drone device 24 may proceed to block 132. At block 132, the drone device 24 may perform the operations described in blocks 74-84 of the method 70 described above. That is, the drone device 24 may download data from the respective RTU 18, perform preliminary analyses as discussed above, and upload data to the cloud-based computing system 12 in response to a communication link to the cloud-based computing system 12 being established. It should be noted that, in some embodiment, the drone device 24 may transmit the alert or indication (block 82) to a suitable computing device within the hydrocarbon site 30 to notify an operator in addition to or in lieu of providing an indication of the alert on a display of the drone device 24. For example, the alert or indication may be transmitted to a local device capable of receiving the alert or indication from the drone device 24 via a local (e.g., within the hydrocarbon site 30) wireless short-range communication network (e.g., Bluetooth®, infrared (IR) communication, radio frequency (RF) communication, and the like). In certain embodiments, in response to determining that the downloaded data are outside the respective expected range of values, the drone device 24 may navigate to (e.g., based on the map of the hydrocarbon site 30) to the local device to transmit the alert to the local device before flying to the next identified RTU 18 (e.g., block 124). Upon receiving the alert, the local device may present the alert to users or personnel via suitable display, audio output, or the like. In certain embodiments, upon receiving the alert, the local device may perform some corrective action (e.g., power down device). In addition, the local device may communicate the alert to a user device (e.g., mobile phone, smartphone, tablet, laptop computer) via the wireless short-range communication network. As an example, such local device may be a local computer or a data processing facility located within a particular range with respect to the RTUs 18, within a range of a communication network accessible by the RTUs 18, or the gateway device of the cloud gateways 26.

While only certain features of the present embodiments disclosed herein have been illustrated and described herein, many modifications and changes will occur to those skilled in the art. It is, therefore, to be understood that the appended claims are intended to cover all such modifications and changes as fall within the true spirit of the present embodiments.

The invention claimed is:

1. A system, comprising:
   a cloud-based computing system communicatively coupled to a first communication network;
   one or more remote terminal units (RTUs) configured to control operations of one or more well devices associated with a hydrocarbon well, wherein the one or more RTUs are inaccessible to the first communication network; and
   a handheld computing device configured to:
      communicatively couple to the one or more RTUs via a second communication network in response to the handheld computing device being within a coverage range of the second communication network;
      automatically download data from the one or more RTUs via the second communication network in response to communicatively coupling to the one or more RTUs and the data being new data available for download from the one or more RTUs;
      perform one or more preliminary analyses on the data after downloading the data from the one or more RTUs, wherein the one or more preliminary analyses comprises generating an alert in response to determining that the data is outside an expected range of values;
      send a command to the one or more RTUs to adjust the operations of the one or more well devices in response to generating the alert;
      communicatively couple to the cloud-based computing system in response to detecting access to the first communication network; and
      transmit the data and one or more results of the one or more preliminary analyses to the cloud-based computing system via the first communication network in response to the handheld computing device communicatively coupling to the cloud-based computing system and after the handheld computing device downloads the data from the one or more RTUs.

2. The system of the claim 1, wherein the second communication network comprises short-range Bluetooth communication, short-range infrared (IR) communication, short-range radio frequency (RF) communication, or any combination thereof.

3. The system of claim 1, comprising one or more cloud gateways configured to receive the data from the handheld computing device and transfer the data to the cloud-based computing system.

4. The system of claim 1, wherein the handheld computing device is configured to scan for a communication link to the first communication network at regular or irregular intervals prior to communicatively coupling to the cloud-based computing system.

5. The system of claim 1, wherein the handheld computing device is configured to scan for identification data sent by the one or more RTUs via the second communication network prior to communicatively coupling to the one or more RTUs.

6. A method, comprising:
   communicatively coupling, via a processor of a handheld computing device, to one or more remote terminal units (RTUs) in response to the processor being within a distance to the one or more RTUs, wherein the one or more RTUs are configured to control operations of one or more well devices associated with a hydrocarbon well;
   automatically downloading, via the processor, data from the one or more RTUs via a first communication network in response to communicatively coupling to the one or more RTUs and the data being new data available for download from the one or more RTUs;
   performing, via the processor, one or more preliminary analyses on the data after downloading the data from the one or more RTUs, wherein the one or more preliminary analyses comprises generating an alert in response to determining that the data is outside an expected range of values;
   sending, via the processor, a command to the one or more RTUs to adjust the operations of the one or more well devices in response to generating the alert;
   communicatively coupling, via the processor, to a cloud-based computing system in response to detecting access to a second communication network, wherein the one or more RTUs are inaccessible to the second communication network; and
   transmitting, via the processor, the data and results of the one or more preliminary analyses to the cloud-based computing system via the second communication network in response to the processor communicatively coupling to the cloud-based computing system after the processor downloads the new data from the one or more RTUs.

7. The method of claim 6, comprising scanning, via the processor, for identification data sent by the one or more RTUs within the distance prior to communicatively coupling to the one or more RTUs.

8. The method of claim 6, comprising:
sending, via the processor, one or more acknowledge messages to the one or more RTUs indicating that the processor has recognized presences of the one or more RTUs; and
receiving, via the processor, one or more acknowledgement signals sent by the one or more RTUs, prior to communicatively coupling to the one or more RTUs.

9. The method of claim 6, wherein communicatively coupling the processor to the one or more RTUs comprises using short-range Bluetooth communication, short-range infrared (IR) communication, short-range radio frequency (RF) communication, or any combination thereof.

10. The system of claim 1, wherein the data comprises a range of tubing head pressure values, a range of case head pressure values, a range of wellhead pressure values, or a combination thereof.

11. The system of claim 1, wherein the data comprises a range of temperature values of hydrocarbons, a range of tubing head temperature values, a range of wellhead temperature values, or a combination thereof.

12. The system of claim 1, wherein the data comprises a range of well depth values, a range of tubing length values, a range of tubing size values, or a combination thereof.

* * * * *